Figure 4:
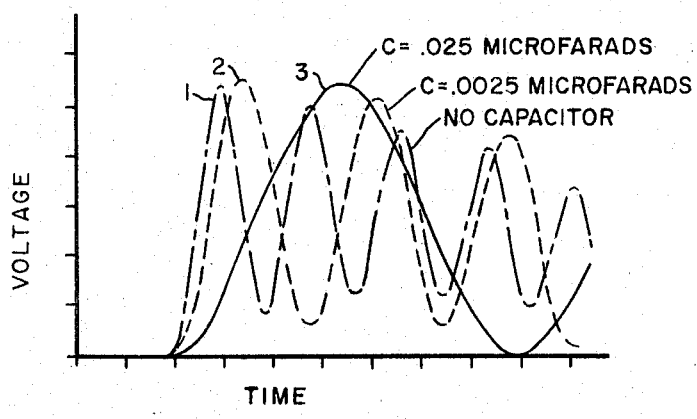

May 14, 1968   R. G. COLCLASER, JR., ET AL   3,383,519
ELECTRIC POWER DISTRIBUTION SYSTEMS
Filed Dec. 23, 1963   2 Sheets-Sheet 1
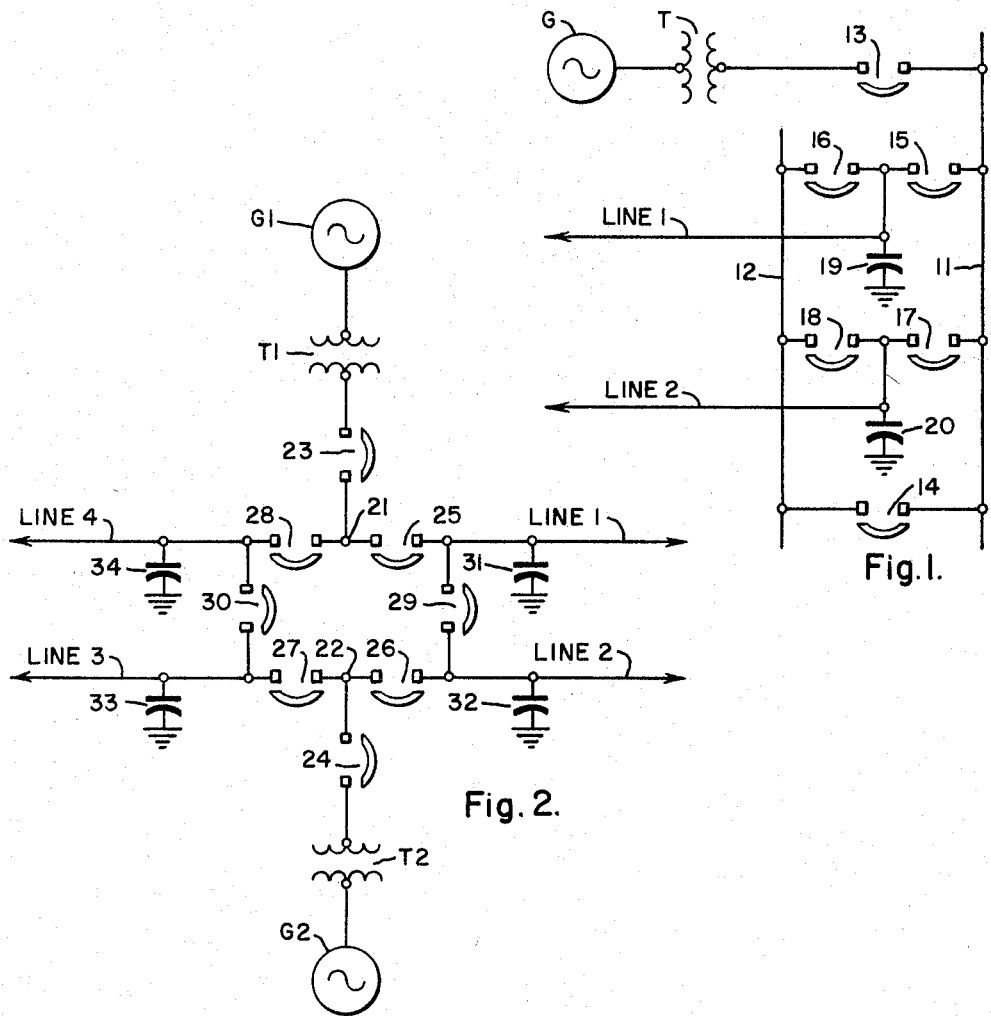
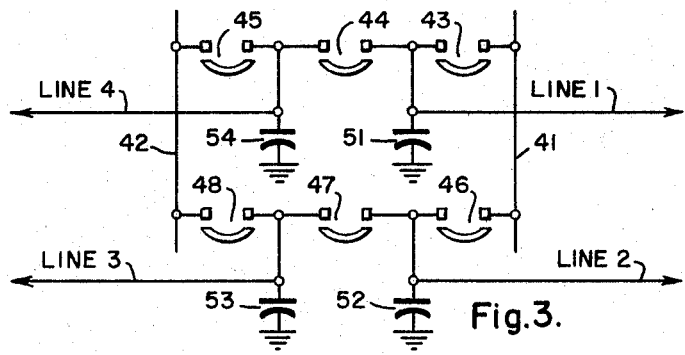
WITNESSES:
Bernard R. Gieguey
Leon M. Garman
INVENTORS
Robert G. Colclaser, Jr. &
Robert E Friedrich.
BY
Clement L. McHale
ATTORNEY

United States Patent Office 3,383,519
Patented May 14, 1968

3,383,519
ELECTRIC POWER DISTRIBUTION SYSTEMS
Robert G. Colclaser, Jr., Franklin Township, and Robert
E. Friedrich, Upper St. Clair Township, Pa., assignors
to Westinghouse Electric Corporation, Pittsburgh, Pa.,
a corporation of Pennsylvania
Filed Dec. 23, 1963, Ser. No. 332,747
2 Claims. (Cl. 307—93)

This invention relates, generally, to electric power distribution systems and, more particularly, to a distribution system in which power buses and transmission lines are interconnected through circuit breakers which may be operated to isolate portions of the system under fault conditions.

It has been recognized for some time that trouble may be experienced with circuit breakers when interrupting highly inductive circuits due to high voltage surges which sometimes occur during extinction of the arc. More recently, an increasing amount of attention has been paid to the high voltage recovery rates produced by faulted transmission lines. Circuit breakers are now required to interrupt higher values of current. The rate of rise of recovery voltage (RRRV) produced by transmission line faults is directly proportional to the fault current. Thus, the conditions under which the higher currents are interrupted are becoming more severe.

Although present oil circuit breakers can interrupt the required currents at the associated RRRV, many air-blast breakers cannot. Laboratory tests have shown that high voltage, high power air breakers are sensitive to high initial RRRV, typically produced by transmission line faults. The usual solution has been to insert a low ohmic value resistor in parallel with the main interrupting break, thereby reducing the RRRV to a value which can be safely handled. The addition of a resistor is unattractive because the size of the tank would have to be increased in order to incorporate a satisfactory resistor. Furthermore, a secondary interrupting break would have to be provided to interrupt the resistor current, thereby complicating the interrupter. Heat dissipation is also a problem when a shunting resistor is utilized. The problem of proving such a breaker in the laboratory must be considered. Under conditions produced in the laboratory the recovery voltage is a one-minus-cosine wave. Under actual field conditions the recovery voltage, even if reduced by a shunt resistor, is still a sawtooth wave which applies a significant amount of voltage shortly after current interruption.

An object of this invention is to provide for controlling the rate of rise of recovery voltage subsequent to the interruption of faults on transmission lines.

Another object of the invention is to alter the wave shape of the line recovery voltage to the approximate shape of laboratory recovery voltages.

A further object of the invention is to reduce the slope and the magnitude of voltage surges associated with switching and lightning.

Other objects of the invention will be explained fully hereinafter or will be apparent to those skilled in the art.

In accordance with the invention, the rate of rise of recovery voltage subsequent to the interruption of faults on transmission lines of a distribution system is reduced by connecting capacitors between the phase conductors of the line and ground. The capacitors do not have to be placed on each bushing of every breaker in the system but only on the line side of the breakers, thereby reducing the number of capacitors required.

Figure 5:
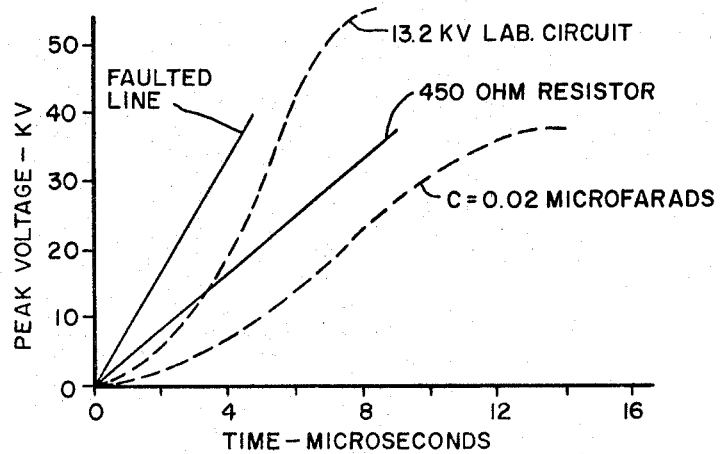

For a better understanding of the nature and objects of the invention, reference may be had to the following detailed description, taken in conjunction with the accompanying drawings, in which:

FIGURES 1, 2 and 3 are single line diagrams of power distribution systems embodying features of the invention;
FIGURE 4 is a reproduction of an oscillogram showing the effect of the addition of a capacitor on a transmission line simulated on an analog computer; and,
FIGURE 5 is a view of comparative curves showing the effect of a capacitor and also a resistor on the rate of rise of recovery voltage.

In the system shown in FIGURE 1, a generator G is connected to a bus 11 through a transformer T and a circuit breaker 13. The bus 11 is connected to a bus 12 through a bus tie breaker 14. A transmission line 1 may be connected to the bus 11 through a breaker 15 or to the bus 12 through a breaker 16. Likewise, a line 2 may be connected to the bus 11 through a breaker 17 or to the bus 12 through a breaker 18. Capacitors 19 and 20 are connected to the lines 1 and 2, respectively. In a three-phase system, a capacitor is connected between each phase conductor and ground. Thus, with the arrangement of six breakers shown in FIGURE 1, six single-phase capacitor units are required to reduce the rate of rise of recovery voltage subsequent to the interruption of faults on the two transmission lines.

In the arrangement shown in FIGURE 2 a generator G1 is connected to a bus 21 through a transformer T1 and a circuit breaker 23. Likewise, a generator G2 is connected to a bus 22 through a transformer T2 and a breaker 24. A line 1 is connected to the bus 21 through a breaker 25, and a line 2 is connected to the bus 22 through a breaker 26. A line 3 is also connected to the bus 22 through a breaker 27, and a line 4 is connected to the bus 21 through a breaker 28. The line 1 may also be connected to the bus 22 through a breaker 29 and the breaker 26, and the line 2 may be connected to the bus 21 through the breakers 29 and 25. Likewise, the line 3 may be connected to the bus 21 through a breaker 30 and the breaker 28, and the line 4 may be connected to the bus 22 through the breakers 30 and 27. Capacitors 31 and 32 are connected between the phase conductors of lines 1 and 2, respectively, and ground. Likewise, capacitors 33 and 34 are connected between the phase conductors of lines 3 and 4, respectively, and ground. Thus, twelve single phase capacitors are required for eight breakers and four transmission lines.

The arrangement shown in FIGURE 3 is suitable for tieing systems together to permit an interchange of power between the systems. A transmission line 1 may be connected to a bus 41 through a breaker 43 and to a bus 42 through breakers 44 and 45. A line 2 may be connected to the bus 41 through a breaker 46 and to the bus 42 through breakers 47 and 48. A line 3 may be connected to the bus 42 through the breaker 48 and to the bus 41 through breakers 47 and 46. Likewise, a line 4 may be connected to the bus 42 through the breaker 45 and to the bus 41 through breakers 44 and 43. Thus, power may be interchanged between systems to which the transmission lines are connected. Capacitors 51 and 52 are connected between the phase conductors of lines 1 and 2, respectively, and ground. Likewise, capacitors 53 and 54 are connected between the phase conductors of lines 3 and 4, respectively, and ground. Thus, six capacitor units are required for each group of three breakers.

It will be noted that in each one of the distribution systems or bus arrangements the capacitors are connected only on the line side of the circuit breakers to which each transmission line is connected. They are disconnected from the bus side of the breaker by the open contacts of the breakers and affect only the line side component. The capacitors are connected directly between each phase conductor and ground. No circuit breaker is interposed between the capacitor and the phase conductor. Each capacitor is utilized to reduce the effect of the travelling wave on a faulted line, thereby improving the interrupting performance of the circuit breaker.

A further advantage of the capacitor is that it acts as a surge voltage absorber, thereby reducing the slope and magnitude of voltage surges associated with switching and lightning. A more economical breaker design can be made. The possibility of voltage breakdown is reduced and test programs need not be extensive on new designs.

By adding capacitors, it is possible to increase the interrupting ability of breakers of some types. Thus, a 10,000 mva. breaker could be rated at, for example, 12,500 mva. by merely applying the required capacitor values. This could result in reduced costs and faster service in rebuilding old breakers.

Since the capacitors do not have to be placed on each bushing of every breaker, but only on the incoming lines, the number of capacitors required is materially reduced. The capacitors may be mounted on the breaker structure or they may be mounted separately from the breaker. The interrupter unit does not have to be changed. In previous systems, the contact members of a breaker have been shunted by a resistor or a resistor and a capacitor which required an auxiliary interrupter in the breaker. The present system should not be confused with the use of capacitors for power factor correction which are not of sufficient value to have any appreciable effect in reducing the RRRV on high voltage systems.

The value of the capacitance required for a given application may be calculated methematically and verified by laboratory tests. For a faulted line, the line side component of recovery voltage may be expressed by the equation:

$$V = 533IZt \times 10^{-6} \tag{1}$$

where

Z is line surge impedance in ohms
I is RMS symmetrical current in amperes
$t$ is time after interruption in $\mu$seconds By adding a line side capacitor, the equation is modified to:

$$V = 533IZ\left[t + ZC\left(\epsilon^{-\frac{1t}{ZC}} - 1\right)\right] \times 10^{-6} \tag{2}$$

C is in $\mu$farads
$\epsilon = 2.716$

This equation is good for $$V \leq \frac{E_\text{P}}{2}$$

where $$E_\text{P} = 2\left(1 - \frac{I_0}{I_\text{R}}\right)E_\text{L-G} \tag{3}$$

where $I_0$ is fault current in amperes
$I_\text{R}$ is rated current in amperes
$E_\text{L-G}$ is peak value of normal line-to-ground voltage Equation 2 may be derived by utilizing Laplace Transforms. In the circuit shown below:

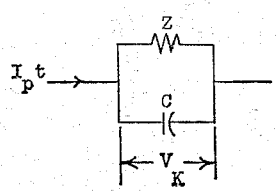

$I_\text{P} = \sqrt{2} \times 377 I_\text{RMS} = 533 I_\text{RMS}$ $\overline{V}_\text{K} = \overline{I}_\text{K} \overline{Z}_\text{K}$ (transformed equation)

$$\overline{Z}_\text{K} = \frac{\frac{Z}{CS}}{Z + \frac{1}{CS}}$$

$\overline{I}_\text{K} = \frac{I_\text{P}}{S^2}$ where $S$ is transform operator $$\overline{V}_\text{K} = \frac{I_\text{P}}{C}\left(\frac{1}{S^2\left(S + \frac{1}{ZC}\right)}\right)$$

$$V(t) = \frac{I_\text{P}}{C}\left[\frac{\epsilon^{-\frac{1t}{ZC}} + \frac{1t}{ZC} - 1}{\left(\frac{1}{ZC}\right)^2}\right]$$

$$V_\text{KV}(t) = 533IZ\left[t + ZC\left(\epsilon^{-\frac{1t}{ZC}} - 1\right)\right] \times 10^{-6}$$

Good until $$V(t) = \frac{E_\text{p}}{2}$$

Using a 230 kv., 15,000 mva. breaker as an example:

Let
$I_0 = 35,000$ amperes
$Z = 450$ ohms
$I_\text{R} = 39,000$ amperes
$E_\text{L-G} = 187$ kv.
$E_\text{P}/2 = 37.4$ kv.

Then $$V_\text{KV} = 8.4\left(t + 450C\left[\epsilon^{-\frac{1t}{450C}} - 1\right]\right) \tag{4}$$

Comparative curves (FIGURE 5) using Equations 1 and 4 are included showing the effect of a capacitor (recommended value .02 $\mu$f.) and also a 450 ohm resistor. Note that the resistor does not reduce the recovery voltage to a shape which can be easily verified in the laboratory, but that it is possible to verify every point on the recovery voltage wave when a capacitor is used.

As explained hereinbefore, a transmission line was set up on an analog computer and the addition of a capacitor simulated. FIGURE 4 is a comparative oscillogram showing the effect of two different values of capacitance. The wave shapes are for:

(1) Faulted line—no capacitance
(2) Faulted line—$C = .0025$ $\mu$f.
(3) Faulted line—$C = .025$ $\mu$f.

From the foregoing description, it is apparent that a capacitor can be used to modify special high recovery rate situations, providing assurance that a circuit breaker will interrupt satisfactorily. Although the primary purpose of the capacitor is to reduce the severity of the recovery voltages produced by line faults, it will also reduce the recovery voltage frequencies produced by line side reactors or transformers. Capacitors of a type utilized for other applications may be used for the present application.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a high-voltage high-power electrical power distribution system, in combination:

(a) a high-voltage high-power bus, (b) a high-voltage high-power transmission line adaptable for supplying high power to a physically remote location,
(c) a high-voltage high-power circuit breaker for electrically interconnecting the high-voltage line to the high-voltage bus, and
(d) capacitance means electrically connected directly between the transmission line and ground on the line side only of the high-voltage high-power circuit breaker,
(e) said capacitance means being of such magnitude as to appreciably lower the initial rate of rise of the recovery voltage, transient imposed across the breaker contacts following a fault current interruption.

2. The high-voltage high-power electrical power distribution system of claim 1, wherein the capacitance means has a value for each phase conductor of about 0.02 microfarad.

References Cited

UNITED STATES PATENTS

| | | | |
|---|---|---|---|
| 2,931,950 | 4/1960 | Minder | 317—12 |
| 2,565,297 | 8/1951 | Crary | 307—98 |
| 2,258,250 | 10/1941 | Kennedy | 317—26 |
| 1,794,971 | 3/1931 | Ludwig | 317—26 |
| 2,321,103 | 6/1943 | Robinson | 333—79 |
| 1,419,872 | 6/1922 | Mclain | 317—11 |
| 771,820 | 10/1964 | De Forest | 317—11 |

ORIS L. RADER, *Primary Examiner.*

W. E. DUNCANSON, *Assistant Examiner.*